US010708161B2

(12) United States Patent
Gupta et al.

(10) Patent No.: US 10,708,161 B2
(45) Date of Patent: Jul. 7, 2020

(54) NETWORK PERFORMANCE MONITORING USING AN ACTIVE MEASUREMENT PROTOCOL AND RELAY MECHANISM

(71) Applicant: Juniper Networks, Inc., Sunnyvale, CA (US)

(72) Inventors: Peyush Gupta, Bangalore (IN); Rajneesh Kumar, Bangalore (IN)

(73) Assignee: Juniper Networks, Inc., Sunnyvale, CA (US)

(*) Notice: Subject to any disclaimer, the term of this patent is extended or adjusted under 35 U.S.C. 154(b) by 117 days.

(21) Appl. No.: 16/138,635

(22) Filed: Sep. 21, 2018

(65) Prior Publication Data
US 2020/0099603 A1    Mar. 26, 2020

(51) Int. Cl.
*H04L 12/26* (2006.01)

(52) U.S. Cl.
CPC .......... *H04L 43/0864* (2013.01); *H04L 43/10* (2013.01); *H04L 43/16* (2013.01); *H04L 43/50* (2013.01)

(58) Field of Classification Search
CPC ..... H04L 43/0864; H04L 43/10; H04L 43/16; H04K 43/50
USPC ........................................................ 709/224
See application file for complete search history.

(56) References Cited

U.S. PATENT DOCUMENTS

| 6,763,380 | B1* | 7/2004 | Mayton | H04L 41/14 709/223 |
| 7,051,098 | B2* | 5/2006 | Masters | G06F 9/4856 709/224 |
| 8,402,540 | B2* | 3/2013 | Kapoor | G06F 9/505 726/23 |
| 2011/0264799 | A1* | 10/2011 | Poivert-Becq | H04L 43/0882 709/224 |

(Continued)

FOREIGN PATENT DOCUMENTS

EP    3099016 A1    11/2016

OTHER PUBLICATIONS

Hedayat, et al. "A Two-Way Active Measurement Protocol", https://tools.ietf.org/html/rfc5357 Sep. 21, 2018 (Print Date), 26 pages.

(Continued)

*Primary Examiner* — Brian Whipple
*Assistant Examiner* — John Fan
(74) *Attorney, Agent, or Firm* — Harrity & Harrity, LLP

(57) ABSTRACT

A first device may provide, periodically throughout a test session and to neighboring devices that are in a network with the first device, a message request for measuring network performance. The neighboring devices, upon receiving the request message, are to use a relay mechanism to determine network performance indicator (NPI) values. The first device may receive, from the neighboring devices and periodically throughout the test session, a response message that includes the NPI values. The first device may determine additional NPI values that measure the network performance (Continued)

between the first device and the neighboring devices. The first device may determine overall NPI values based on the NPI values and the additional NPI values. The first device may identify a preferred next-hop to one of the neighboring devices based on the overall NPI values, where the preferred next-hop is part of a preferred path through the network.

20 Claims, 10 Drawing Sheets

(56) References Cited

U.S. PATENT DOCUMENTS

| | | | |
|---|---|---|---|
| 2014/0169183 A1 | 6/2014 | Allan et al. | |
| 2016/0028603 A1* | 1/2016 | Chakrabarti | H04L 43/0852 |
| | | | 370/252 |
| 2016/0352865 A1* | 12/2016 | Gupta | H04L 67/14 |

OTHER PUBLICATIONS

Extended European Search Report for Application No. EP19181905.1, dated Jan. 22, 2020, 8 pages.
Hedayat K., et al., "A Two-Way Active Measurement Protocol (TWAMP)," RFC5357, https://tools.ieft.org/html/rfc5357, Oct. 2008, 27 pages.

* cited by examiner

NETWORK PERFORMANCE MONITORING USING AN ACTIVE MEASUREMENT PROTOCOL AND RELAY MECHANISM

BACKGROUND

A measurement protocol may be used to measure network performance of a group of network devices. For example, a two-way active measurement protocol (TWAMP) may define a standard used to measure network performance between any two network devices that support TWAMP. As such, the group of network devices may use a test session to send probe packets between network devices to measure the network performance.

SUMMARY

According to some possible implementations, a method may include initiating, by a network device, a connection with one or more neighboring network devices, wherein the network device and the one or more neighboring network devices are part of a group of network devices that are in a network and that are configured with a protocol for measuring network performance, and wherein initiating the connection causes the network device and the one or more neighboring network devices to exchange a relay mechanism that is to be used for measuring the network performance. The method may include causing a test session to be established and to be used for measuring the network performance. The method may include providing to the one or more neighboring network devices, and periodically throughout the test session, a request message associated with requesting a first group of network performance indicator values that measure bi-directional network performance for one or more paths between the one or more neighboring network devices and a particular network device that is an endpoint in the network. The one or more neighboring network devices, upon receiving the request message, may use the relay mechanism to determine the first group of network performance indicator values. The relay mechanism may permit the one or more neighboring network devices and other upstream network devices to exchange additional request messages and corresponding response messages that are used to determine the first group of network performance indicator values. The method may include receiving from the one or more neighboring network devices, and periodically throughout the test session, a response message that includes the first group of network performance indicator values. The method may include determining a second group of network performance indicator values that measure network performance between the network device and the one or more neighboring network devices. The method may include determining overall network performance indicator values based on the first group of network performance indicator values and the second group of network performance indicator values. The method may include identifying a preferred next-hop to one of the one or more neighboring network devices based on the overall network performance indicator values. The preferred next-hop may be part of a preferred path to the particular network device that is the endpoint in the network. The preferred next-hop may be used for traffic flow being routed through the network.

According to some possible implementations, a network device may include one or more memories, and one or more processors to receive, from another network device, a request to establish a connection with the other network device. The network device and the other network device may be part of a group of network devices that are part of a network and that are configured with a protocol for measuring network performance. The one or more processors may provide, to the other network device, a response to the request to cause the connection to be established. The other network device may use the connection to interact with the network device to establish a test session and exchange a relay mechanism that is to be used for measuring the network performance. The one or more processors may receive, from the other network device and periodically throughout the test session, a request message that requests a first network performance indicator value that measures the network performance for a path between the network device and a particular network device that is used as an endpoint in the network. The one or more processors may provide, periodically throughout the test session and by using the relay mechanism, one or more additional request messages to one or more neighboring network devices to cause the one or more neighboring network devices to provide one or more additional response messages that include a group of network performance indicator values that measure the network performance between the one or more neighboring network devices and the particular network device that is used as the endpoint in the network. The one or more processors may determine, periodically throughout the test session, the first network performance indicator value based on the group of network performance indicator values that have been provided by the one or more neighboring network devices. The one or more processors may provide, to the other network device and periodically throughout the test session, a response message that includes the first network performance indicator value to cause the other network device to use the first network performance indicator value as part of determining an overall network performance indicator value and to identify a preferred next-hop to one of the one or more neighboring network devices based on the overall network performance indicator values. The preferred next-hop may be part of a preferred path to the particular network device that is the endpoint in the network. The preferred next-hop may be used for traffic flow being routed through the network.

According to some possible implementations, a non-transitory computer-readable medium may store instructions that include one or more instructions that, when executed by one or more processors of a network device, cause the one or more processors to provide, to one or more neighboring network devices and periodically throughout a test session, a request message associated with requesting a first group of network performance indicator values that measure bi-directional network performance between the one or more neighboring network devices and a particular network device used as an endpoint in a network. The network device and the one or more neighboring network devices may be included in a group of network devices that are part of the network and that are configured with a protocol that includes a relay mechanism for measuring the network performance. The request message may include a final destination address. The one or more neighboring network devices, upon receiving the request message, may use the relay mechanism and the final destination address to determine the first group of network performance indicator values. The relay mechanism may permit the one or more neighboring network devices and other upstream network devices to exchange additional request messages and corresponding response messages that are used to determine the first group of network performance indicator values. The one or more instructions may cause the one or more processors to receive, from the one or more neighboring network devices and periodically throughout the test session, a response message that includes the first group of network performance indicator values. The one or more instructions may cause the one or more processors to determine a second group of network performance indicator values that measure the network performance between the network device and the one or more neighboring network devices. The one or more instructions may cause the one or more processors to determine overall network performance indicator values based on the first group of network performance indicator values and the second group of network performance indicator values. The one or more instructions may cause the one or more processors to identify a preferred next-hop to one of the one or more neighboring network devices based on the overall network performance indicator values. The preferred next-hop may be part of a preferred path to the particular network device that is the endpoint in the network. The preferred next-hop may be used for traffic flow being routed through the network.

DETAILED DESCRIPTION

Figure 1A:
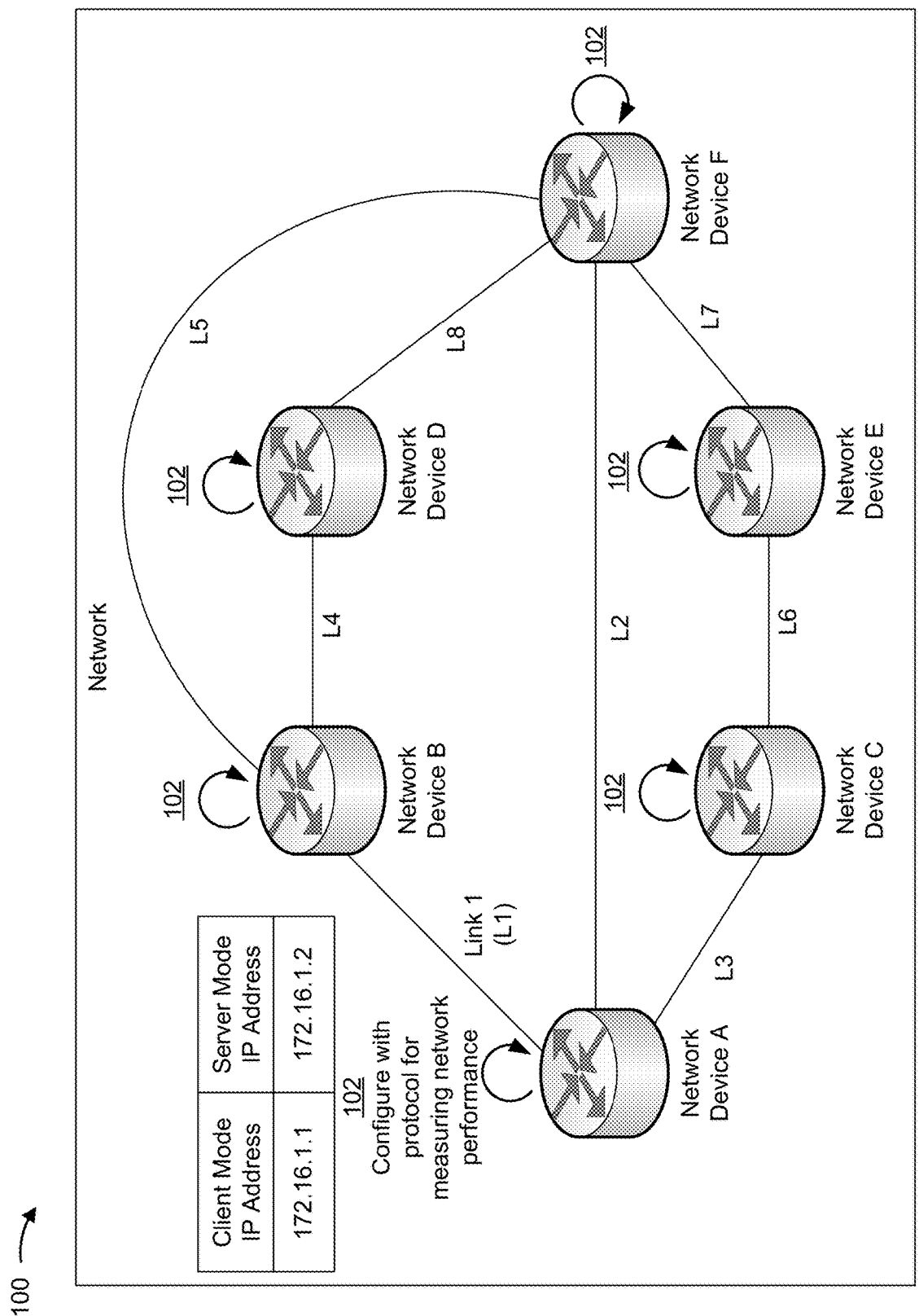
FIGS. 1A-1E are diagrams of an example implementation described herein.

The following detailed description of example implementations refers to the accompanying drawings. The same reference numbers in different drawings may identify the same or similar elements.

A measurement protocol, such as TWAMP, may be used to measure network performance of a group of network devices (e.g., a group of routers, a group of data center servers, and/or the like) that are part of a network, such as a mesh network that includes multiple hops between two end points. This allows the group of network devices to establish a test session for sending probe packets between network devices to measure network performance (e.g., by measuring a round trip time (RTT) of packets traveling between network devices).

In some cases, when a service is offered over a network (e.g., via the group of network devices), a service-level agreement (SLA) between a network service provider and a customer may stipulate that certain network performance indicators are to be monitored and/or satisfied. For example, the SLA may indicate that the group of network devices need to perform or adhere to a threshold level of performance to be in compliance with terms of the SLA.

However, the measurement protocol may be an ineffective solution for monitoring network performance if the network includes multiple paths (e.g., as may be found in a mesh network). This is because existing TWAMP-based measurements are limited to compute performance indicators (i.e., SLA parameters) for a single hop but do not provide a means for computing aggregated performance indicators in the case of a multi-hop network (e.g., the mesh network).

As an example, if the group of network devices are configured with TWAMP, and a first network device has a first connection to a second network device and a second connection to a third network device, the first network device may determine a lowest-available RTT value as between the first connection and the second connection, and may select the lowest-available RTT value, regardless of whether a connection associated with the lowest-available RTT value is part of a most efficient path to an endpoint in the network (e.g., an edge network device). As a specific example, if the first connection has a RTT value of 5 milliseconds (ms), and the second connection has a RTT value of 10 ms, the first network device would select the first connection to be used as a next-hop for packets traveling through the network. However, if a first complete path to the endpoint in the network that uses the first connection has total RTT of 50 ms, and a second complete path to the endpoint in the network that uses the second connection has a total RTT of 40 ms, then the second connection (e.g., that includes the RTT value of 10 ms) should be the next-hop for the first network device (rather than the first connection, with the RTT value of 5 ms).

Some implementations described herein provide a network device to monitor network performance of a group of network devices that are part of a network by using a protocol that includes a relay mechanism. For example, the network device may establish a test session that allows messages to be routed through the network for measuring the network performance. In this case, the network device may provide, to one or more neighboring network devices (e.g., a network device that is a next-hop destination), a request message that may cause the one or more neighboring network devices to provide the network device with a response message that includes a first group of network performance indicator values (e.g., RTT values) that measure the network performance between the one or more neighboring network devices and an edge network device. The first group of network performance indicator values may be determined by one or more upstream network devices. Methods for using the relay mechanism to intelligently route network performance indicator values downstream to the network device are described further herein (e.g., with respect to FIGS. 1A-1E).

Additionally, the network device may determine a second group of network performance indicator values that measure the network performance between the network device and the one or more neighboring network devices. This may allow the network device to determine overall network performance indicator values (e.g., total RTT values for particular paths to the edge network device) based on the first group of network performance indicator values and the second group of network performance indicator values. In this case, the network device may identify a preferred next-hop to one of the one or more neighboring network devices based on the overall network performance indicator values (e.g., a next-hop associated with an RTT value of a preferred path, where a preferred path is a path with a lowest total RTT). This allows the preferred next-hop to be used for traffic flow being routed through the network.

In this way, the network device efficiently and effectively monitors the network performance of the group of network device (e.g., relative to a network device using a protocol without the relay mechanism). Furthermore, the network device conserves resources (e.g., processing resources, network resources, memory resources, and/or the like) by identifying a network performance indicator value that may be used to identify a next-hop associated with an optimal path. Using the example provided above, the network device would identify the second connection (e.g., with the RTT value of 10 ms) as the optimal, despite the first connection having a lower next-hop RTT value (e.g., with the RTT value of 5 ms). This conserves resources by allowing traffic flow through the network to take more efficient total paths to the edge network device.

FIGS. 1A-1E are diagrams of an example implementation 100 described herein. For example, example implementation may include a group of network devices (shown as Network Device A, Network Device B, Network Device C, Network Device D, Network Device E, and Network Device F) that are part of a network, a set of connections between network devices (shown as Link 1 (L1), L2, L3, L4, L5, L6, L7, and L8), a first endpoint of traffic that is to flow through the network (shown as Traffic End Point A with internet protocol (IP) address 10.0.0.0/8), and a second endpoint of the traffic that is to flow through the network (shown as Traffic End Point B with IP address 20.0.0.0/8).

The group of network devices, as used herein, may refer to routers, switches, hubs, data center servers, and/or the like. The network, as used herein, may refer to a mesh network and/or any other type of network that involves multiple next-hop paths between network devices that are part of the network.

As shown in FIG. 1A, and by reference number 102, the group of network devices may be configured with a protocol for measuring network performance. For example, the group of network devices may be configured with a two-way active measurement protocol (TWAMP), a one-way active measurement protocol (OAMP), and/or a similar type of protocol.

In some implementations, the protocol to configure the group of network devices may include a control session phase and a test session phase. The control session phase may be used for managing (e.g., initiating, starting, ending, etc.) a test session and the test session phase may be used for measuring the network performance. In some implementations, the test session phase of the protocol may be used to measure the network performance by using a ping function (e.g., via an echo command) to send and receive request messages and response messages that may be used to measure the network performance.

In some implementations, to perform the test session phase, the group of network devices may be configured with two modes that may permit the group of network devices to use the ping function. For example, the group of network devices may be configured with a first mode (e.g., a client mode) for sending request messages as part of the ping function and a second mode (e.g., server mode) for receiving request messages and providing response messages. In this case, the group of network devices may be configured with separate IP address information for the first mode and the second mode. As shown as an example, the IP address information may include a first IP address (172.16.1.1) that is used for the first mode and a second IP address (172.16.1.2) that is used for the second mode.

In some implementations, the group of network devices may be configured with a protocol (e.g., TWAMP) that includes a relay mechanism. The relay mechanism (sometimes referred to as a relay mode) may be a rule or set of rules that are enabled when a test session is established and that cause the group of network devices to automatically perform test session tasks (e.g., sending request messages, providing response messages, etc.). As an example, the relay mechanism may include a first rule indicating that an edge network device (e.g., Network Device A) that orchestrates establishing the test session is to periodically provide request messages to one or more neighboring network devices (e.g., a network device that is a next-hop destination), a second rule indicating that a network device is to provide a request message (e.g., as part of a ping function) to one or more neighboring network devices based on the network device receiving a request message from a downstream network device, a third rule indicating when the edge network device is to end the test session, a fourth rule indicating to determine a network performance indicator value after receiving a request message, a fifth rule indicating to provide a network performance indicator value in a response message that is to be provided downstream to a network device that provided a corresponding request message, a sixth rule indicating for the edge network device to determine an overall network performance indicator value for a path based on receiving a message request, and/or the like.

In this way, the group of network devices are configured with a protocol for measuring the network performance.

Figure 1B:
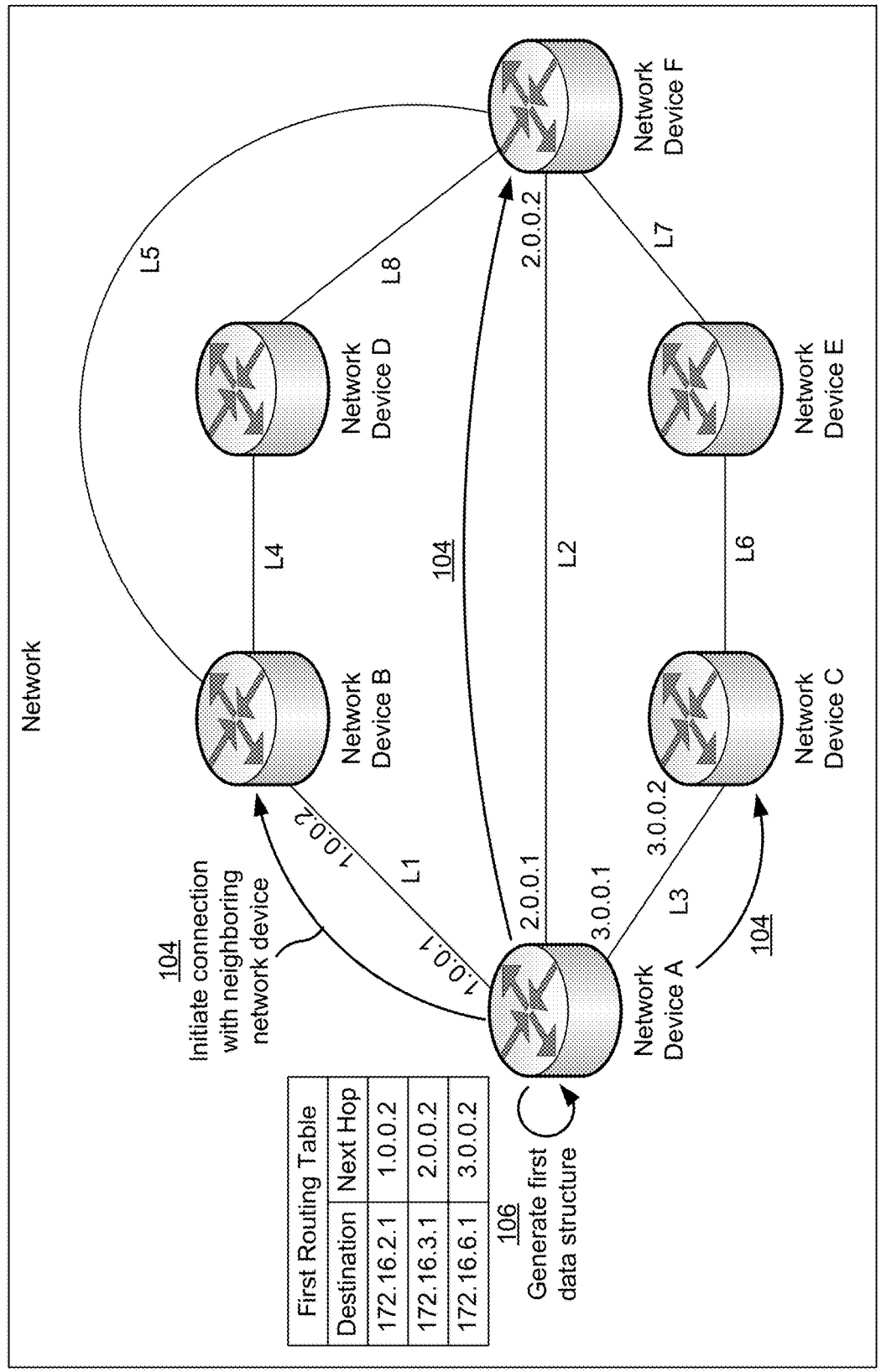

As shown in FIG. 1B, and by reference number 104, the first network device (Network Device A) may initiate a connection with one or more neighboring network devices (shown as Network Device B, Network Device C, and Network Device F). For example, the first network device may initiate a connection with the one or more neighboring network devices to allow the first network device and the one or more neighboring network devices to share the IP address information (e.g., which may be needed when providing request messages and/or response messages during a test session).

In some implementations, the first network device may initiate the connection with the one or more neighboring network devices using a request-accept procedure. For example, the first network device may provide, to the one or more neighboring network devices, a connection request message to initiate the connection. The connection request message may include the first IP address of the first network device (e.g., 172.16.1.1) that is used for the first mode (e.g., the client mode).

Additionally, the one or more neighboring network devices may provide an acceptance message to the first network device to cause the connection to be established. The acceptance message may include a second IP address for the one or more neighboring network devices that are used for the second mode (e.g., the server mode), a next-hop identifier associated with a particular neighboring network device, such as a port identifier, and/or the like. As shown as an example, a second network device (Network Device B) may provide, as part of an acceptance message, a second IP address (172.16.2.1) that is used for the second mode (e.g., the server mode) and a next-hop identifier (1.0.0.2) associated with the second network device. The third network device (Network Device F) may provide, as part of an acceptance message, a second IP address (172.16.3.1) that is used for the second mode and a next-hop identifier (2.0.0.2) associated with the third network device. The fourth network device (Network Device C) may provide, as part of an acceptance message, a second IP address (172.16.6.1) that is used for the second mode and a next-hop identifier (3.0.0.2) associated with the fourth network device.

As shown by reference number 106, the first network device may generate a first data structure. For example, the first network device may generate a first data structure (e.g., a routing table, a forwarding table, and/or the like) to store the IP address information and the next-hop identifiers in a manner that associates the IP address information and the next-hop identifiers. As shown as an example, the first data structure may associate the second IP address of the second network device (172.16.2.1) and a next-hop identifier of the second network device (1.0.0.2). Additionally, the first data structure may associate the second IP address of the third network device (172.16.3.1) and a next-hop identifier of the third network device (2.0.0.2). Additionally, the first data structure may associate the second IP address of the fourth network device (172.16.6.1) and a next-hop identifier of the fourth network device (3.0.0.2).

While implementations described above show the first network device as initiating the connection and generating the first data structure, it is to be understood that this is shown simply as an illustration. In practice, all (or some) of the group of network devices may initiate connections with neighboring network devices and may generate first data structures. As an example, the second network device (Network Device B) may initiate a connection with the third network device (Network Device F) and a fifth network device (Network Device D) and may generate a first data structure in a manner similar to that shown in connection with the first network device.

In this way, the group of network devices are able to initiate a connection with the one or more neighboring devices, which may be used to establish a test session for measuring the network performance, as described below.

Figure 1C:
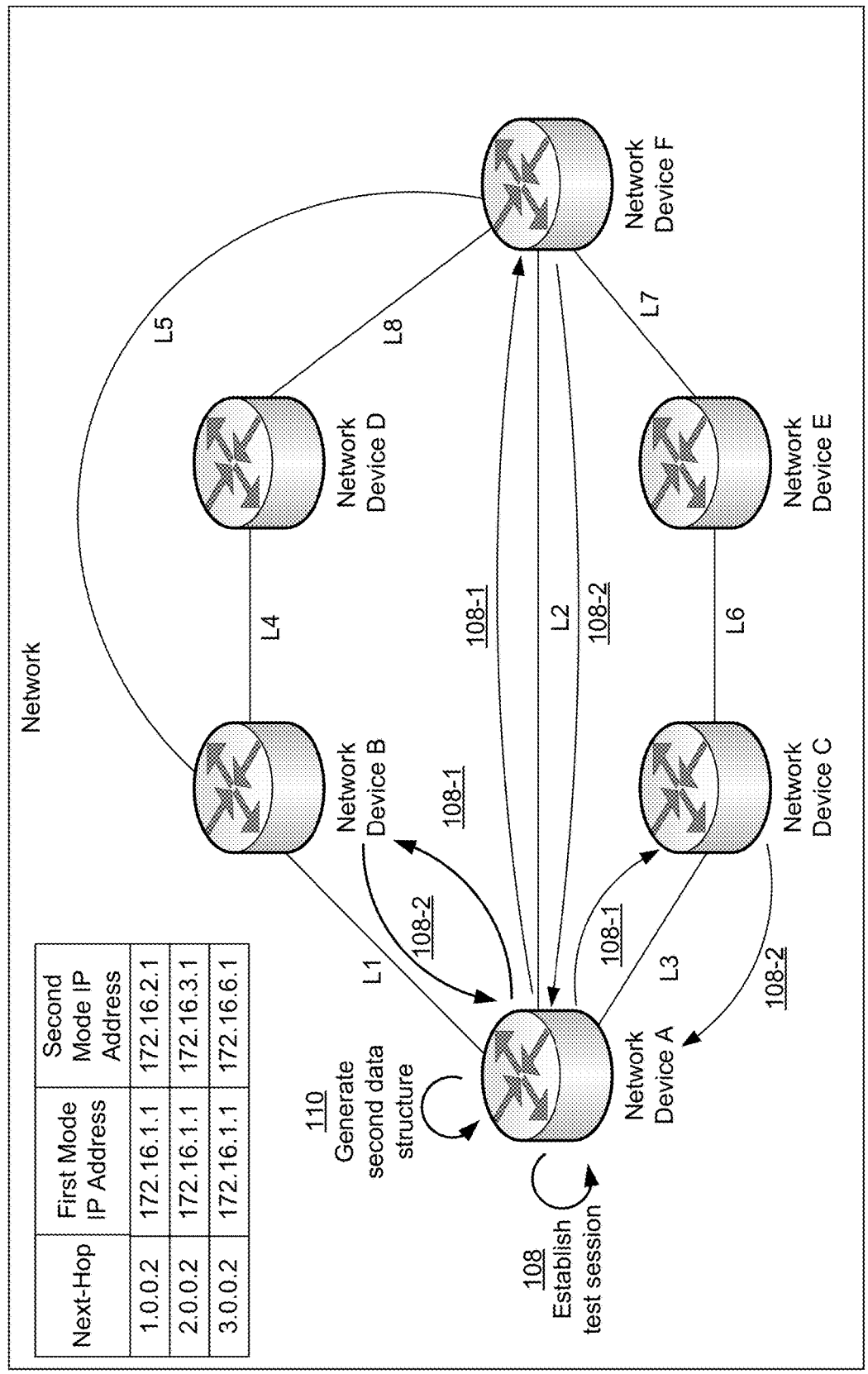

As shown in FIG. 1C, and by reference number 108, the first network device may establish the test session. For example, and as shown by reference numbers 108-1, the first network device may provide, to the one or more neighboring network devices, a test session setup request. In this case, the first network device may identify an IP address and/or next-hop identifier for the one or more neighboring network devices (e.g., by referencing the first data structure), and may provide the test session setup request to ports of the one or more neighboring network devices (e.g., a port associated with next-hop identifier 1.0.0.2, a port associated with next-hop identifier 2.0.0.2, a port associated with next-hop identifier 3.0.0.2).

As shown by reference number 108-2, receipt of the test session setup requests may cause the one or more neighboring network devices to generate and provide a test session setup response to the first network device indicating that the test session setup request has been accepted and that the test session has been established. In this case, receipt of the test session setup response may cause the first network device to enable the relay mechanism that had been configured in connection with FIG. 1A. For example, the first network device may enable the relay mechanism such that the first network device will periodically check whether the rule or the set of rules that are part of the relay mechanism are satisfied.

Figure 1D:
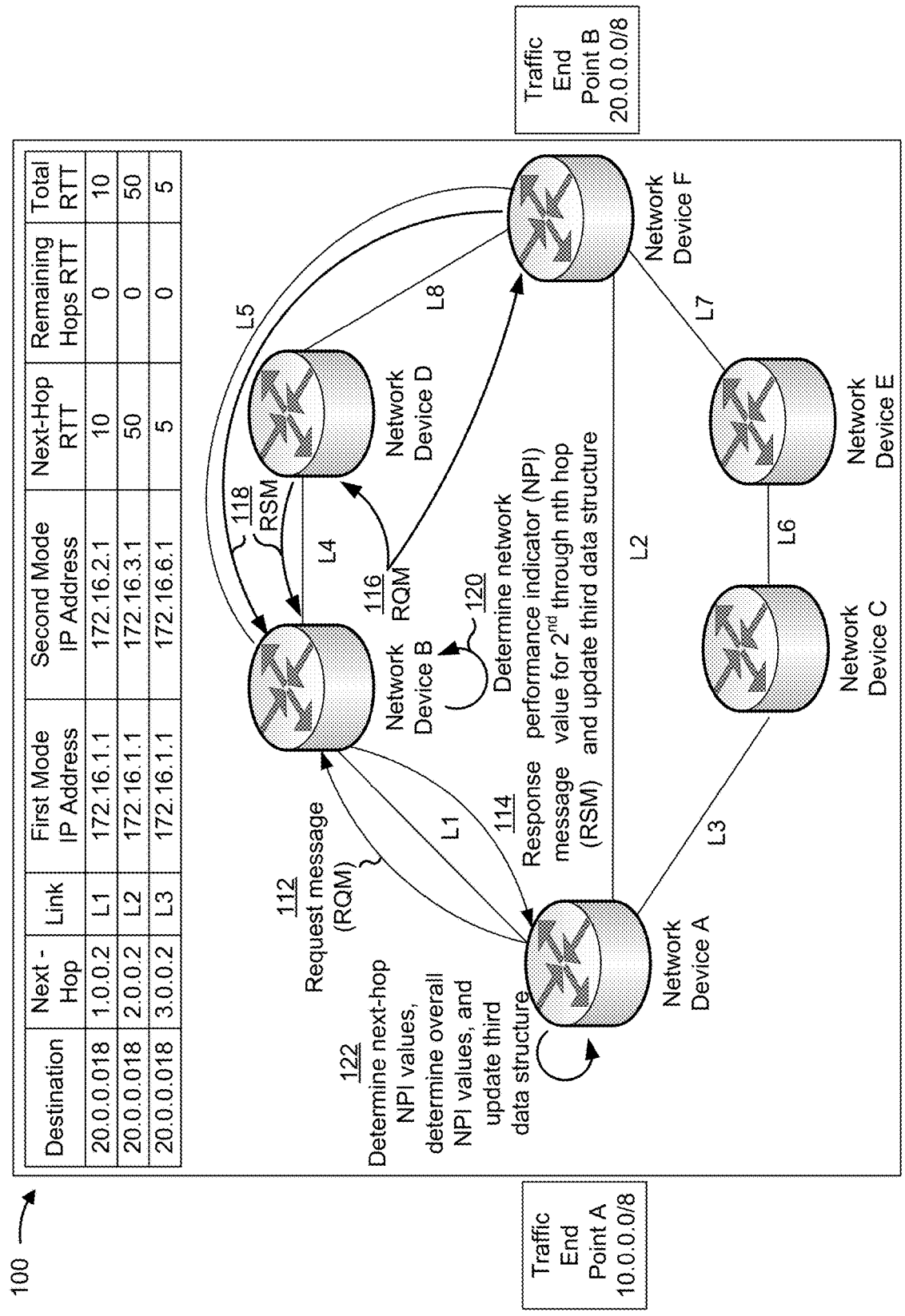

As an example, a first rule may be enabled which indicates that the first network device is to periodically provide request messages to one or more neighboring network devices (e.g., which may cause the first network device to begin sending request messages that are used to measure network performance, as described in FIG. 1D). As another example, a second rule may be enabled which indicates that a network device is to provide a request message to one or more neighboring network devices based on receiving a request message from a downstream network device (e.g., which may cause an upstream network device, such as Network Device B, to send request messages to Network Device D and Network Device F based on receiving a request message from Network Device A, as described in connection with FIGS. 1D and 1E).

As shown by reference number 110, the first network device may generate a second data structure. For example, the first network device may generate the second data structure to store the first IP address of the first network device (e.g., associated with the client mode), the second IP addresses (associated with the server mode) of the one or more neighboring network devices, and the next-hop identifiers associated with the one or more neighboring network devices. In this case, the second data structure may be used to associate the first IP address of the first network device, the second IP addresses of the one or more neighboring network devices, and the next-hop identifiers associated with the one or more neighboring network devices, such that the second data structure may be referenced when using the test session to measure the network performance. In some implementations, the first data structure and the second data structure, as described herein, may be a single data structure (e.g., with sufficient fields to represent all values stored by the first data structure and the second data structure).

While implementations described above show the first network device interacting with the one or more neighboring network devices to establish the test session (thereby enabling the relay mechanism) and to generate the second data structure, it is to be understood that all (or some) network devices may have the relay mechanism enabled. For example, the other network devices may receive an indication from a downstream network device that the test session has been enabled, and may generate the first data structure (such that each network device has a first data structure).

In some implementations, a test session may be established to measure a particular type of network performance indicator. For example, as described in FIGS. 1D and 1E, the test session may be used to determine a round trip time (RTT) between network devices. In some implementations, the test session may be established to measure other types of network performance indicators, such as a latency value, a hop count value, a bandwidth value, a path reliability value, a packet loss value, a throughput value, and/or the like. In some implementations, multiple test sessions may be created to measure multiple types of network performance indicators.

In this way, the first network device establishes the test session and the group of network devices enable the relay mechanism that may be used to measure the network performance.

As shown in FIG. 1D, and by reference number 112, the first network device may provide a request message to the one or more neighboring network devices (shown by way of example as being providing to one of the neighboring network devices—Network Device B). For example, as described above, the first network device may have enabled the relay mechanism, which may include the first rule indicating to periodically provide request messages to the one or more neighboring network devices.

A request message, as used herein, may refer to a packet (e.g., a test packet, a probe packet, and/or the like) that is provided as part of a test to measure network performance (e.g., as part of a ping function or a similar function). In some implementations, the request message (e.g., a header of the request message) may include a sequence number value, a timestamp (e.g., indicating a time the request message is provided to a neighboring network device), a destination IP address associated with the second traffic end point (shown as Traffic End Point B, as a destination IP address of 20.0.0.0/8), and/or the like. By including the destination IP address in the request message and including the destination address in the response message, the first network device is able to identify response messages that are received as being part of the test session.

As shown by reference number 114, the one or more neighboring network devices may provide a response message (RSM) to the first network device. For example, the second network device (Network Device B) may, upon receiving the request message, process the request message to identify the destination IP address associated with the test session. In this case, the second network device may perform a data structure lookup to determine whether the destination IP address is stored in association with a first group of network performance indicator values (shown in FIG. 1D as remaining RTT). Because the request message is a first request message in the test session, the second network device will not have previously determined the first group of network performance indicators, which may result in the data structure lookup returning a value of zero (shown as the value of zero in the Remaining Hops entry in the third data structure). The first group of network performance indicator values, as used herein, may refer to network performance indicator values that will be used to measure network performance for a second hop in a path until a final hop in a path (e.g., network performance between Network Device B and Network Device F). Additionally, the second network device may generate the request message to include the destination IP address and the result of the data structure lookup (the value zero) and may provide the request message to the first network device.

As shown by reference number 116, the second network device may provide a request message (RQM) to one or more additional neighboring network devices (e.g., the fifth network device, shown as Network Device D, and the third network device, shown as Network Device F). For example, the second network device may provide the request message based on the second rule of the relay mechanism that indicates to provide the request message based on receiving a request message from a downstream network device (e.g., the first network device). In this case, the second network device may include the destination IP address in the request message, as described above.

As shown by reference number 118, the one or more additional neighboring network devices may provide, to the second network device, a response message (RSM). In this case, the one or more additional neighboring network devices may perform a data structure lookup to determine whether network performance indicator values (e.g., representing a third hop through final hop in a path through the network) are stored in association with destination IP address. Because the request message is a first request message received by the one or more additional neighboring network devices during the test session, the data structure lookup may return a value of zero. While not shown, a similar process may be used between the fifth network device (Network Device D) and the third network device (Network Device F) (e.g., via link eight (L8)).

As shown by reference number 120, the second network device may determine a network performance indicator (NPI) value and may update the third data structure. For example, the second network device may determine a network performance indicator value that is part of the first group of network performance indicator values, based on receiving the request message from the one or more additional neighboring network devices.

As an example, the second network device may determine an RTT value using time stamps associated with the request message and the response message. For example, the second network device may process the request message to identify a first time at which the request message was sent to an additional neighboring network device and may identify a second time at which the response message was received from the additional neighboring network device. As such, the second network device may be able to use the first time and the second time to determine the RTT value. A similar process may be performed by the fifth network device (Network Device D) (however the third network device, Network Device F, will not determine a network performance indicator value because it does not connect to any other upstream network devices).

It is to be understood that the process shown with respect to reference numbers 114 through 120 are described in detail by way of example. In practice, the same process may be used until request messages and response messages have been provided to all neighboring upstream network devices (e.g., a similar process would be used as between Network Device A and Network Device F, Network Device A and Network Device C, Network Device C and Network Device E, and Network Device E and Network Device F).

As shown by reference number 122, the first network device may determine one or more next-hop network performance indicator values, may determine overall network performance indicator values, and may update the third data structure. In some implementations, the first network device may determine next-hop network performance indicator values. For example, the first network device may determine next-hop network performance indicator values in a manner similar to that described above. As an example, the first network device may determine a next-hop RTT value using time stamps associated with the request message and the response message. As shown as an example, the first network device may determine a first RTT value of 10 ms that represents the RTT between Network Device A and Network Device B, a second RTT value of 50 ms that represents the RTT between Network Device A and Network Device F, and a third RTT value of 10 ms that represents the RTT between Network Device A and Network Device C.

In some implementations, the first network device may determine overall network performance indicator values. For example, the first network device may determine overall network performance indicator values by processing the next-hop network performance indicator values and the first group of network performance indicator values (e.g., values representing performance associated with a second hop through a final hop). Continuing with the above example, the first network device may add the next-hop RTT value (e.g., 10 ms) and a network performance indicator value included in the response message (e.g., zero) to determine an overall RTT value (10 ms).

In some implementations, the first network device may update the third data structure. For example, the first network device may update the third data structure to include the next-hop network performance indicator values, the first group of network performance indicator values that represent values associated with the second hop through final hop, and the overall network performance indicator values.

Figure 1E:
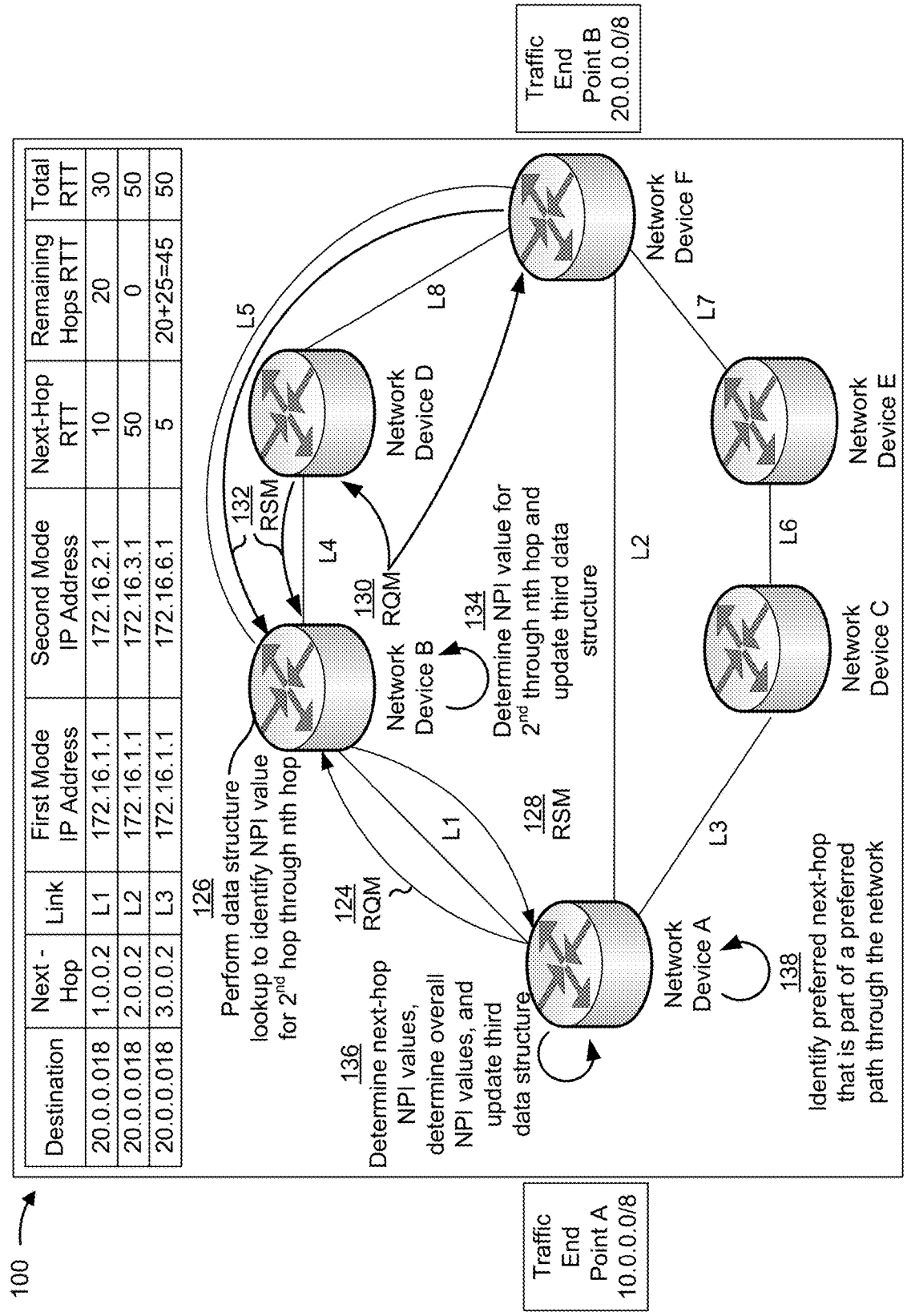

The process shown in FIG. 1D may be repeated as the first network device periodically provides request message to the one or more upstream network devices, which will allow the group of network devices to continue to determine network performance indicator values, update data structure values, and identify overall network performance indicator values that may be used to identify a preferred path through the network, as shown in FIG. 1E.

In this way, the first network device determines overall network performance indicator values by using the relay mechanism to orchestrate a chain of request messages and response messages that are provided upstream to the other network devices that are part of the network.

As shown in FIG. 1E, and by reference number 124, the first network device may provide another request message (RQM) to the second network device, in a manner described elsewhere herein. As shown by reference number 126, the second network device may perform a data structure lookup to identify a network performance indicator value (e.g., for the first group of network performance indicator values that represent values associated with a second hop through an nth hop). In this case, the second network device may perform a data structure lookup to identify the network performance indicator value that had been determined based on previous ping commands (e.g., based on the request messages and the response messages depicted in FIG. 1D).

In some implementations, the network performance indicator value that represents the second hop through nth hop may be a best-available network performance indicator value as between multiple paths through the network. In the example shown, assume the fifth link (L5) between the second network device and the third network device (Network Device F) has an RTT value of 20 ms. Further assume the fourth link between the second network device and the fifth network device (Network Device D) has an RTT value of 5 ms. Further assume the eighth link between the fifth network device and the third network device has an RTT value of 30 ms. In this example, the network performance indicator value stored as the remaining hops RTT value would be the RTT value of 20 ms (e.g., because this path is shorter than the path that uses the fourth and eighth links).

As shown by reference number 128, the second network device may provide another response message (RSM) to the first network device, in a manner described elsewhere herein. In this the response message may include the destination IP address and the particular network performance indicator value associated with the first group of network performance indicator values (e.g., 20 ms).

As shown by reference number 130, the second network device may provide additional request messages (RQMs) to the additional neighboring network devices (e.g., Network Device D and Network Device F). As shown by reference number 132, the additional neighboring network devices may provide additional response messages (RSMs) to the second network device.

As shown by reference number 134, the second network device may determine one or more network performance indicator values and may update the third data structure, in a manner described elsewhere herein. In some implementations, the first group of network devices may not be accessible until several rounds of pings have been performed as part of the test session. For example, if at a time the second network device performs the data structure (as shown in reference number 126), the fifth network device (Network Device D) has yet to provide a response message that includes a network performance indicator value, the second network device may identify a different network performance indicator value to use as part of the response message back to the first network device. Continuing with the previous example, assume the RTT value of 30 ms between Network Device D and Network Device F has yet to be provided to Network Device B. In this example, Network Device B will update the third data structure with an RTT value of 5 ms. As such, Network Device B would not be able to update the third data structure to include the RTT value of 30 ms until a subsequent iteration of the ping function.

As shown by reference number 136, the first network device may determine next-hop NPI values, determine overall NPI values, and update the third data structure, in a manner described elsewhere herein. In some implementations, the first network device may only determine next-hop performance indicator values on the first iteration of the ping function. As shown an example, the first network device may determine that the first link (L1) has a total RTT value of 30 ms, that the second link (L2) has a total RTT value of 50 ms, and that the third link (L3) has a total RTT value of 50 ms.

As shown by reference number 138, the first network device may identify a preferred next-hop that is part of a preferred path through the network. For example, the first network device may identify, as the preferred next-hop, a next hop associated with a best available overall network performance indicator value. In the example shown, the first network device may identify a port associated with the second network device as a next-hop (shown as 1.0.0.2). It should be noted that without use of a relay mechanism, the network device would have identified a port associated with the fourth network device (Network Device C), using an analysis that is based purely on the next-hop RTT values determined by the first network device.

In this way, the group of network devices efficiently and effectively monitor network performance (e.g., relative to a group of network devices using a protocol without the relay mechanism). Furthermore, the group of network devices conserves resources (e.g., processing resources, network resources, memory resources, and/or the like) by identifying network performance indicator values that may be used to identify a next-hop associated with an optimal path.

As indicated above, FIGS. 1A-1E are provided merely as examples. Other examples are possible and may differ from what was described with regard to FIGS. 1A-1E. For example, there may be additional devices and/or networks, fewer devices and/or networks, different devices and/or networks, or differently arranged devices and/or networks than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) of example implementations 100 may perform one or more functions described as being performed by another set of devices of example implementations 100.

Figure 2:
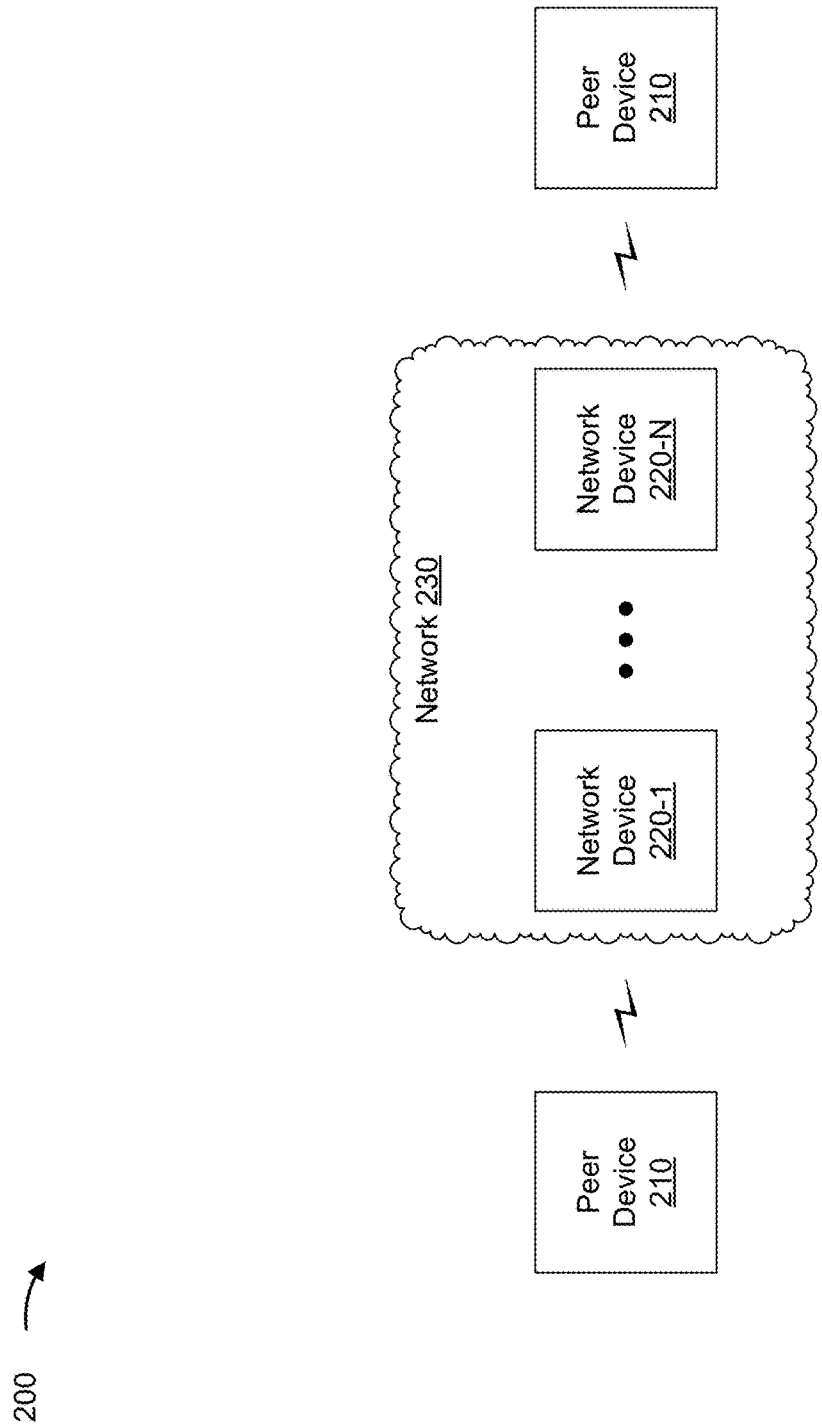
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more peer devices 210, a group of network devices 220 (shown as Network Device 220-1 through Network Device 220-N), and a network 230. Devices of environment 200 may interconnect via wired connections, wireless connections, or a combination of wired and wireless connections.

Peer device 210 includes one or more devices capable of receiving and/or providing network traffic and/or information associated with the network traffic. For example, peer device 210 may include a traffic transfer device, such as a router, a gateway, a switch, a firewall, a hub, a bridge, a reverse proxy, a server (e.g., a proxy server, a server executing a virtual machine, etc.), a security device, an intrusion detection device, a load balancer, or a similar type of device. Additionally, or alternatively, peer device 210 may include an endpoint device that is a source or a destination for network traffic. For example, peer device 210 may include a computer or a similar type of device. Peer device 210 may receive network traffic from and/or may provide network traffic to other peer devices 210 via network 230 (e.g., by routing packets using network device(s) 220 as an intermediary). In some implementations, a first peer device 210 may be associated with a source of traffic (e.g., a device creating traffic, an access network between the device creating the traffic and network 230, and/or the like). In some implementations, a second peer device 210 may be associated with a destination of the traffic (e.g., a device receiving the traffic).

Network device 220 includes one or more devices capable of receiving, processing, storing, routing, and/or providing traffic (e.g., a packet, a packet replica, other information or metadata, and/or the like) in a manner described herein. For example, network device 220 may include a router, such as a label switching router (LSR), a label edge router (LER), an ingress router, an egress router, a provider router (e.g., a provider edge router, a provider core router, etc.), a virtual router, and/or the like. Additionally, or alternatively, network device 220 may include a gateway, a switch, a firewall, a hub, a bridge, a reverse proxy, a server (e.g., a proxy server, a cloud server, a data center server, etc.), a load balancer, and/or a similar device. In some implementations, network device 220 may be a physical device implemented within a housing, such as a chassis. In some implementations, network device 220 may be a virtual device implemented by one or more computer devices of a cloud computing environment or a data center. In some implementations, a group of network devices 220 may be a group of data center nodes that are used to route traffic flow through network 230.

In some implementations, network device 220 may be configured with a protocol (e.g., a two-way access measurement protocol (TWAMP) that includes a relay mechanism. In some implementations, network device 220 may be part of a group of network devices 220 that are configured with the protocol, and that use the relay mechanism to measure network performance in a manner described elsewhere herein. In some implementations, a first network device 220 may be a first endpoint in the group of network devices 220 and a second network device 220 may be a second endpoint in the group of network devices 220. In this case, the first network device 220 may establish a test session that may be allow the group of network devices to send a series of request messages and response messages to enable the first network device 220 to determine overall network performance indicator values.

Network 230 includes one or more wired and/or wireless networks. For example, network 230 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
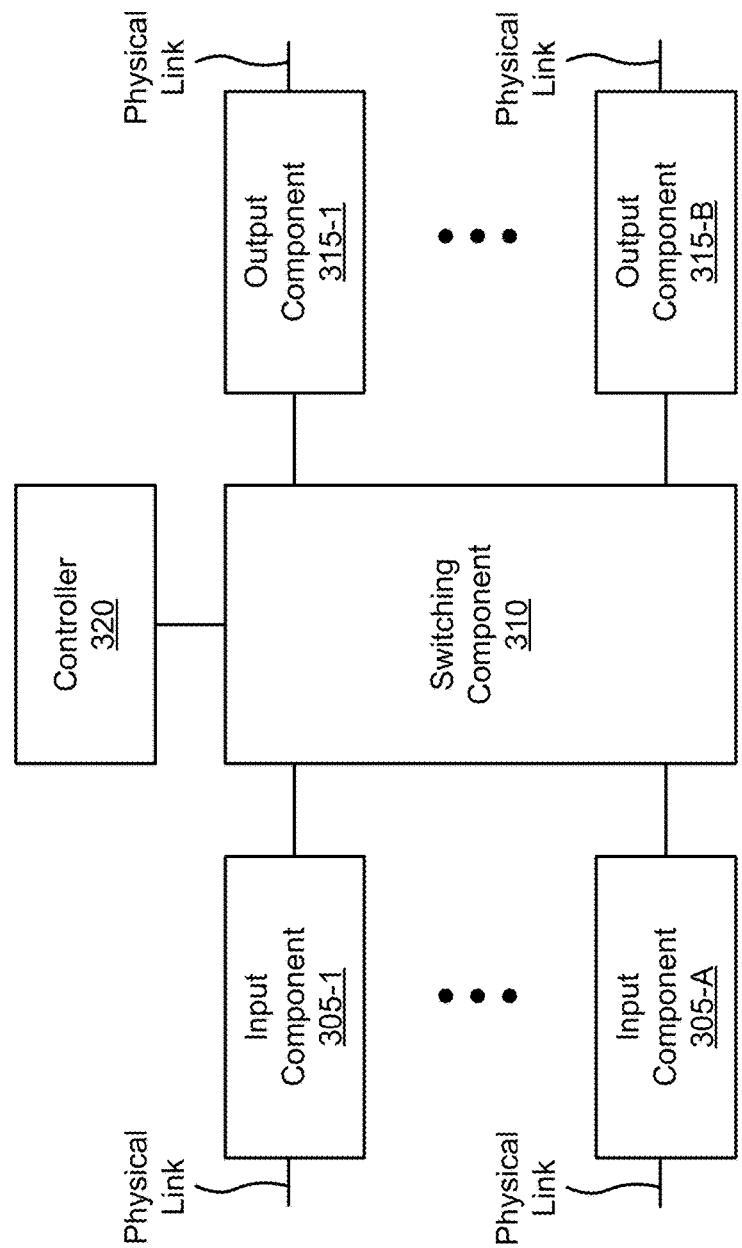
FIG. 3 is a diagram of example components of one or more devices of FIG. 2.

FIG. 3 is a diagram of example components of a device 300. Device 300 may correspond to peer devices 210 and/or network device 220. In some implementations, peer devices 210 and/or network device 220 may include one or more devices 300 and/or one or more components of device 300. As shown in FIG. 3, device 300 may include one or more input components 305-1 through 305-B (B≥1) (hereinafter referred to collectively as input components 305, and individually as input component 305), a switching component 310, one or more output components 315-1 through 315-C (C≥1) (hereinafter referred to collectively as output components 315, and individually as output component 315), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., and input/output component may be a combination of input component 305 and output component 315).

Controller 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor or processing component. The processor is implemented in hardware, firmware, or a combination of software and hardware. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets. In some cases, controller 320 may create a session table based on information determined while initializing a link fault detection (e.g., BFD) session, and may forward the session table to input components 305 and/or output components 315.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
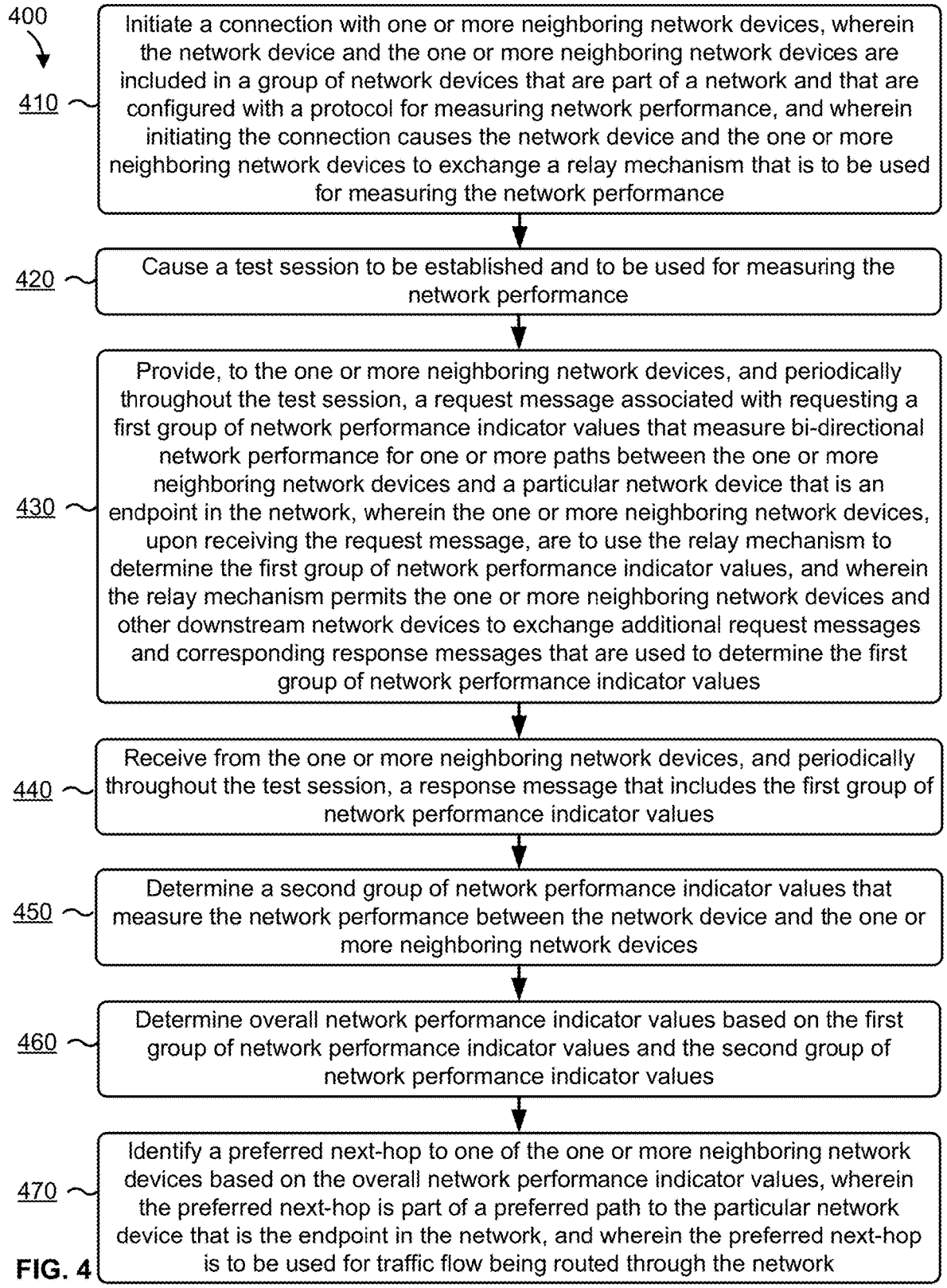
FIGS. 4-6 are flow charts of an example process for monitoring network performance of a group of network devices using an active measurement protocol and a relay mechanism.

FIG. 4 is a flow chart of an example process 400 for monitoring network performance of a group of network devices using an active measurement protocol and a relay mechanism. In some implementations, one or more process blocks of FIG. 4 may be performed by a network device (e.g., network device 220). In some implementations, one or more process blocks of FIG. 4 may be performed by another device or a group of devices separate from or including the network device, such as a peer device (e.g., peer device 210).

As shown in FIG. 4, process 400 may include initiating a connection with one or more neighboring network devices, wherein the network device and the one or more neighboring network devices are part of a group of network devices that are in a network and that are configured with a protocol for measuring network performance, and wherein initiating the connection causes the network device and the one or more neighboring network devices to exchange a relay mechanism that is to be used for measuring the network performance (block 410). For example, the network device (e.g., using input component 305, switching component 310, output component 315, controller 320, and/or the like) may initiate a connection with one or more neighboring network devices, as described above in connection with FIGS. 1A-1E. In some implementations, the network device and the one or more neighboring network devices may be part of a group of network devices that are in a network and that are configured with a protocol for measuring network performance. In some implementations, initiating the connection may cause the network device and the one or more neighboring network devices to exchange a relay mechanism that is to be used for measuring the network performance.

As further shown in FIG. 4, process 400 may include causing a test session to be established and to be used for measuring the network performance (block 420). For example, the network device (e.g., using switching component 310, output component 315, controller 320, and/or the like) may cause a test session to be established and to be used for measuring the network performance, as described above in connection with FIGS. 1A-1E.

As further shown in FIG. 4, process 400 may include providing, to the one or more neighboring network devices, and periodically throughout the test session, a request message associated with requesting a first group of network performance indicator values that measure bi-directional network performance for one or more paths between the one or more neighboring network devices and a particular network device that is an endpoint in the network, wherein the one or more neighboring network devices, upon receiving the request message, are to use the relay mechanism to determine the first group of network performance indicator values, and wherein the relay mechanism permits the one or more neighboring network devices and other downstream network devices to exchange additional request messages and corresponding response messages that are used to determine the first group of network performance indicator values (block 430). For example, the network device (e.g., using switching component 310, output component 315, controller 320, and/or the like) may provide, to the one or more neighboring network devices, and periodically throughout the test session, a request message associated with requesting a first group of network performance indicator values that measure the network performance for one or more paths between the one or more neighboring network devices and a particular network device that is an endpoint in the network, as described above in connection with FIGS. 1A-1E. In some implementations, the one or more neighboring network devices, upon receiving the request message, may use the relay mechanism to determine the first group of network performance indicator values.

As further shown in FIG. 4, process 400 may include receiving, from the one or more neighboring network devices, and periodically throughout the test session, a response message that includes the first group of network performance indicator values (block 440). For example, the network device (e.g., using input component 305, switching component 310, controller 320, and/or the like) may receive, from the one or more neighboring network devices, and periodically throughout the test session, a response message that includes the first group of network performance indicator values, as described above in connection with FIGS. 1A-1E.

As further shown in FIG. 4, process 400 may include determining a second group of network performance indicator values that measure the network performance between the network device and the one or more neighboring network devices (block 450). For example, the network device (e.g., using switching component 310, controller 320, and/or the like) may determine a second group of network performance indicator values that measure the network performance between the network device and the one or more neighboring network devices, as described above in connection with FIGS. 1A-1E.

As further shown in FIG. 4, process 400 may include determining overall network performance indicator values based on the first group of network performance indicator values and the second group of network performance indicator values (block 460). For example, the network device (e.g., using switching component 310, controller 320, and/or the like) may determine overall network performance indicator values based on the first group of network performance indicator values and the second group of network performance indicator values, as described above in connection with FIGS. 1A-1E.

As further shown in FIG. 4, process 400 may include identifying a preferred next-hop to one of the one or more neighboring network devices based on the overall network performance indicator values, wherein the preferred next-hop is part of a preferred path to the particular network device that is the endpoint in the network, and wherein the preferred next-hop is to be used for traffic flow being routed through the network (block 470). For example, the network device (e.g., using switching component 310, controller 320, and/or the like) may identify a preferred next-hop to one of the one or more neighboring network devices based on the overall network performance indicator values, as described above in connection with FIGS. 1A-1E. In some implementations, the preferred next-hop may be part of a preferred path to the particular network device that is the endpoint in the network, and the preferred next-hop may be used for traffic flow being routed through the network.

Process 400 may include additional implementations, such as any single implementation or any combination of implementations described below and/or in connection with one or more other processes described elsewhere herein.

In some implementations, the protocol may be a two-way active measurement protocol (TWAMP). In some implementations, when providing the request message, the network device may provide the request message to the one or more neighboring network devices to cause the one or more neighboring network devices to use the relay mechanism and the final destination address to determine the first group of performance indicator values.

In some implementations, the first group of network performance indicator values and the second group of network performance indicator values may be determined using a first set of time stamps indicating times when the request message is sent by one of the group of network devices and a second set of time stamps indicating times when the response message is received by another one of the group of network devices.

In some implementations, the network device may populate, periodically throughout the test session, a data structure with values used to measure the network performance, where the values used to measure the network performance are associated with a destination address of a destination associated with the test session, a first Internet protocol (IP) address associated with a first mode of the protocol used by the network device during the test session, and one or more IP addresses associated with a second mode of the protocol used by the one or more neighboring network devices during the test session.

In some implementations, the network device may update, periodically throughout the test session, the first group of network performance indicator values that are stored using a data structure that associates the first group of network performance indicator values with a destination address of a destination associated with the test session, a first Internet protocol (IP) address associated with a first mode of the protocol used by the network device during the test session, and one or more IP addresses associated with a second mode of the protocol used by the one or more neighboring network devices during the test session, and may update the overall network performance indicator values based on updating the first group of network performance indicator values.

In some implementations, when receiving the first group of network performance indicator values, the network device may receive a first network performance indicator value from a first neighboring network device of the one or more neighboring network devices. Additionally, when determining the second group of network performance indicator values, the network device may identify a first time at which a first instance of the request message was sent to the first neighboring network device and a second time at which a first instance of the response message was received from the first neighboring network device, and may determine a first network performance indicator value of the second group of network performance indicator values based on the first time and the second time. Additionally, when determining the overall network performance indicator values, the network device may determine an overall network performance indicator value for a first path that traverses through the network device, the first neighboring network device, and the particular network device used as the endpoint in the network, by adding the first network performance indicator value of the first group of network performance indicator values and the first network performance indicator value of the second group of network performance indicator values.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
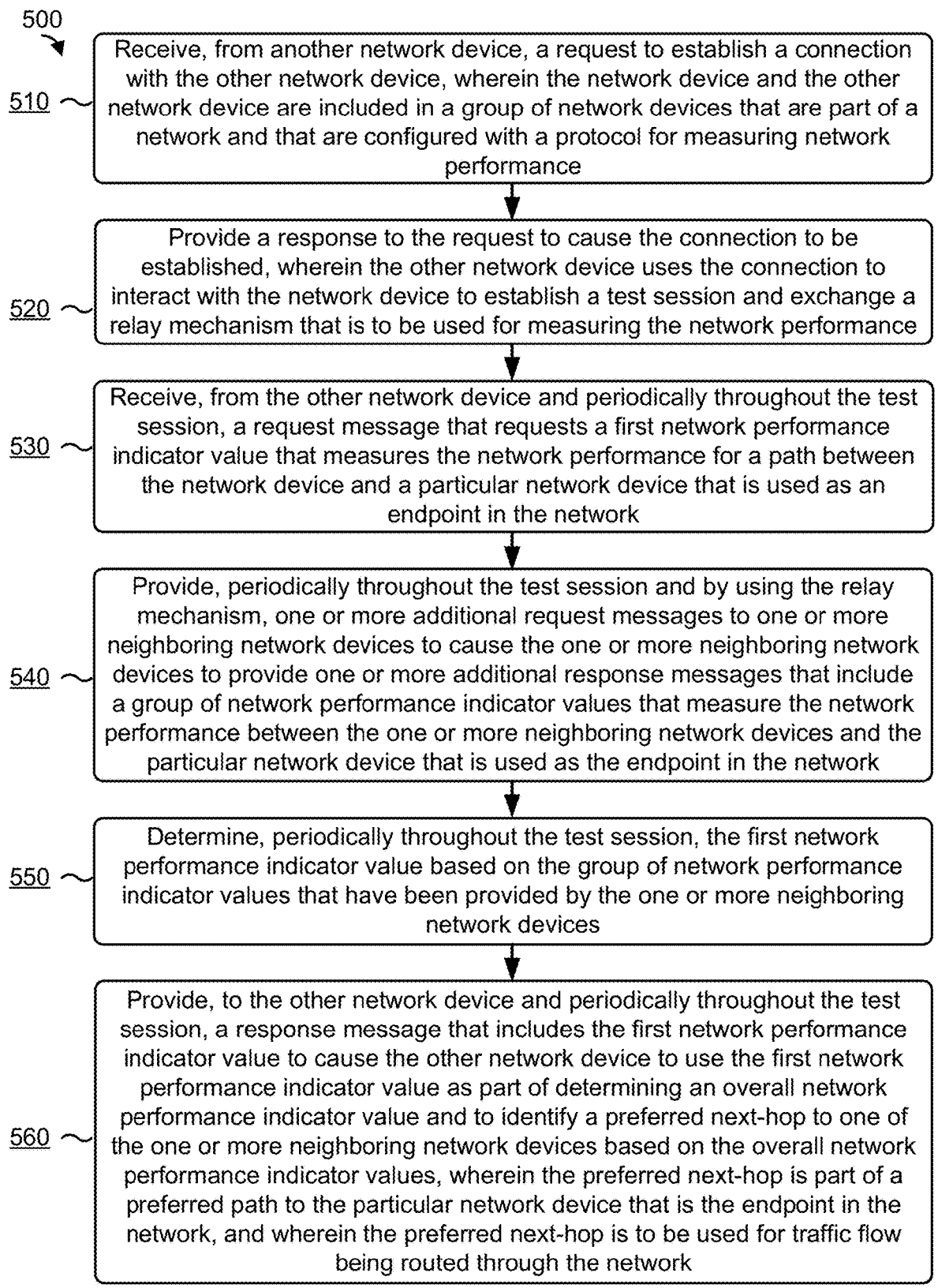

FIG. 5 is a flow chart of an example process 500 for monitoring network performance of a group of network devices using an active measurement protocol and a relay mechanism. In some implementations, one or more process blocks of FIG. 5 may be performed by a network device (e.g., network device 220). In some implementations, one or more process blocks of FIG. 5 may be performed by another device or a group of devices separate from or including the network device, such as a peer device (e.g., peer device 210).

As shown in FIG. 5, process 500 may include receiving, from another network device, a request to establish a connection with the other network device, wherein the network device and the other network device are part of a group of network devices that are part of a network and that are configured with a protocol for measuring network performance (block 510). For example, the network device (e.g., using input component 305, switching component 310, controller 320, and/or the like) may receive, from another network device, a request to establish a connection with the other network device, as described above in connection with FIGS. 1A-1E. In some implementations, the network device and the other network device may be part of a group of network devices that are part of a network and that are configured with a protocol for measuring network performance.

As further shown in FIG. 5, process 500 may include providing, to the other network device, a response to the request to cause the connection to be established, wherein the other network device uses the connection to interact with the network device to establish a test session and exchange a relay mechanism that is to be used for measuring the network performance (block 520). For example, the network device (e.g., using switching component 310, output component 315, controller 320, and/or the like) may provide, to the other network device, a response to the request to cause the connection to be established, as described above in connection with FIGS. 1A-1E. In some implementations, the other network device may use the connection to interact with the network device to establish a test session and exchange a relay mechanism that is to be used for measuring the network performance.

As further shown in FIG. 5, process 500 may include receiving, from the other network device and periodically throughout the test session, a request message that requests a first network performance indicator value that measures the network performance for a path between the network device and a particular network device that is used as an endpoint in the network (block 530). For example, the network device (e.g., using input component 305, switching component 310, controller 320, and/or the like) may receive, from the other network device and periodically throughout the test session, a request message that requests a first network performance indicator value that measures the network performance for a path between the network device and a particular network device that is used as an endpoint in the network, as described above in connection with FIGS. 1A-1E.

As further shown in FIG. 5, process 500 may include providing, periodically throughout the test session and by using the relay mechanism, one or more additional request messages to one or more neighboring network devices to cause the one or more neighboring network devices to provide one or more additional response messages that include a group of network performance indicator values that measure the network performance between the one or more neighboring network devices and the particular network device that is used as the endpoint in the network (block 540). For example, the network device (e.g., using switching component 310, output component 315, controller 320, and/or the like) may provide, periodically throughout the test session and by using the relay mechanism, one or more additional request messages to one or more neighboring network devices to cause the one or more neighboring network devices to provide one or more additional response messages that include a group of network performance indicator values that measure the network performance between the one or more neighboring network devices and the particular network device that is used as the endpoint in the network, as described above in connection with FIGS. 1A-1E.

As further shown in FIG. 5, process 500 may include determining, periodically throughout the test session, the first network performance indicator value based on the group of network performance indicator values that have been provided by the one or more neighboring network devices (block 550). For example, the network device (e.g., using switching component 310, controller 320, and/or the like) may determine, periodically throughout the test session, the first network performance indicator value based on the group of network performance indicator values that have been provided by the one or more neighboring network devices, as described above in connection with FIGS. 1A-1E.

As further shown in FIG. 5, process 500 may include providing, to the other network device and periodically throughout the test session, a response message that includes the first network performance indicator value to cause the other network device to use the first network performance indicator value as part of determining an overall network performance indicator value and to identify a preferred next-hop to one of the one or more neighboring network devices based on the overall network performance indicator values, wherein the preferred next-hop is part of a preferred path to the particular network device that is the endpoint in the network, and wherein the preferred next-hop is to be used for traffic flow being routed through the network (block 560). For example, the network device (e.g., using switching component 310, output component 315, controller 320, and/or the like) may provide, to the other network device and periodically throughout the test session, a response message that includes the first network performance indicator value to cause the other network device to use the first network performance indicator value as part of determining an overall network performance indicator value and to identify a preferred next-hop to one of the one or more neighboring network devices based on the overall network performance indicator values, as described above in connection with FIGS. 1A-1E. In some implementations, the preferred next-hop may be part of a preferred path to the particular network device that is the endpoint in the network, and the preferred next-hop may be used for traffic flow being routed through the network.

Process 500 may include additional implementations, such as any single implementation or any combination of implementations described below and/or in connection with one or more other processes described elsewhere herein.

In some implementations, the protocol may be a two-way active measurement protocol (TWAMP). In some implementations, the group of network devices may be part of a network that includes multiple paths to the particular network device that is used as the endpoint. In some implementations, the request message and the one or more additional request messages may include a final destination address, and, when providing the one or more additional request messages, the network device may provide the one or more additional request messages to the one or more neighboring network devices to cause the one or more neighboring network devices to use the relay mechanism and the final destination address to determine the one or more performance indicator values.

In some implementations, the group of network performance indicator values may be a first group of network performance indicator values. Additionally, when determining the first network performance indicator value, the network device may identify a first time at which the one or more additional request messages are sent to the one or more neighboring network devices, may identify a second time at which the one or more additional response messages are received from the one or more neighboring network devices, may determine a second group of network performance indicator values based on the first time and the second time, and may determine the first network performance indicator value based on the one or more network performance indicator values and the second group of network performance indicator values.

In some implementations, the group of network performance indicator values may be a first group of network performance indicator values, where multiple paths through the group of network devices are present between the network device and the particular network device that is used as the endpoint. Additionally, when determining the first network performance indicator value, the network device may determine a second group of network performance indicator values that measure the network performance between the network device and the one or more neighboring network devices, may determine a third group of network performance indicator values that are based on the first group of network performance indicator values and the second group of network performance indicator values, and may use, as the first network performance indicator value, a particular network performance indicator value, of the third group of network performance indicator values, that is associated with a best available network performance level.

In some implementations, the network device may populate, periodically throughout the test session, a data structure with values used to measure the network performance, where the values used to measure the network performance are associated with a destination address of a destination associated with the test session, a first Internet protocol (IP) address associated with a first mode of the protocol used by the network device during the test session, and one or more IP addresses associated with a second mode of the protocol used by the one or more neighboring network devices during the test session.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
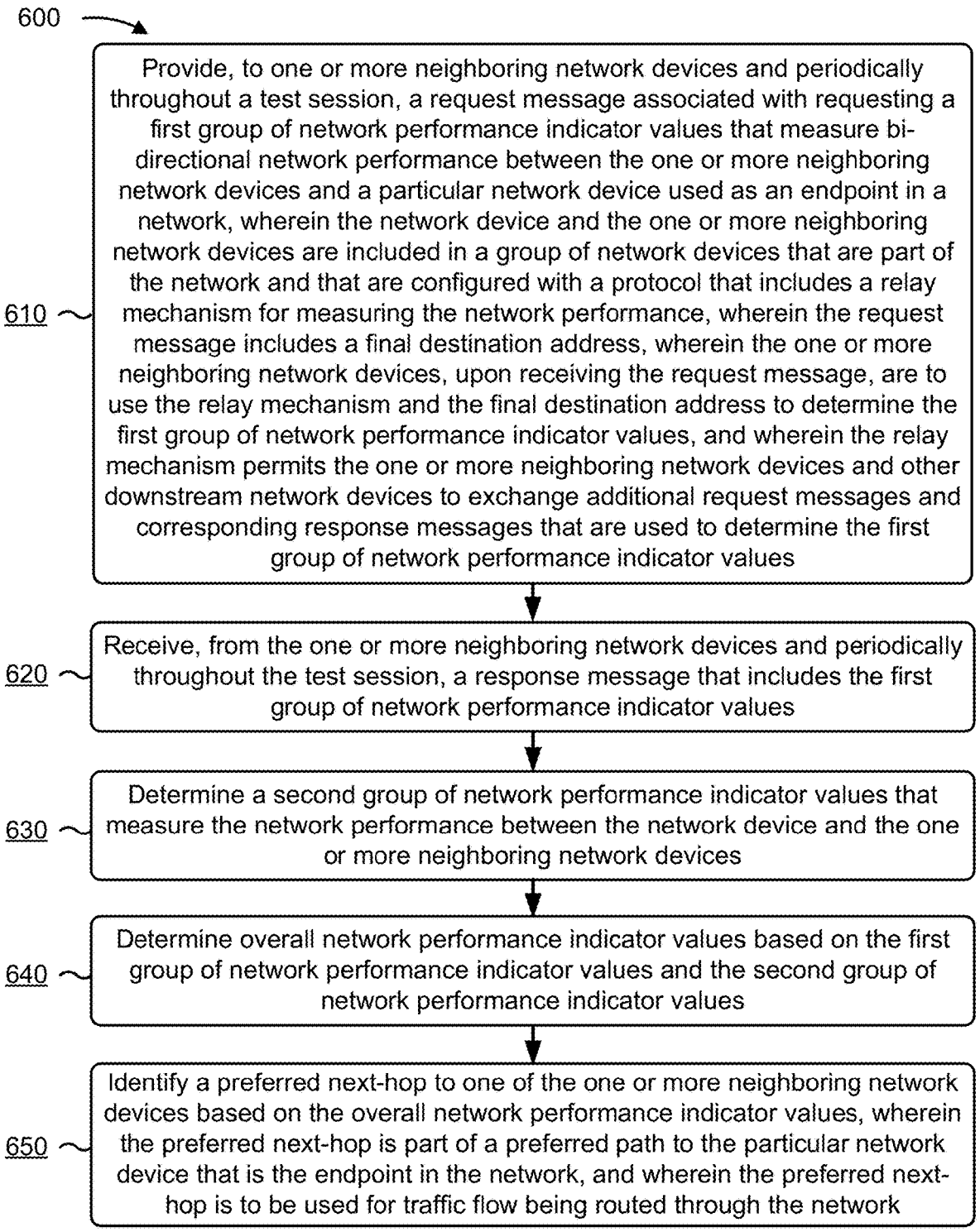

FIG. 6 is a flow chart of an example process 600 for monitoring network performance of a group of network devices using an active measurement protocol and a relay mechanism. In some implementations, one or more process blocks of FIG. 6 may be performed by a network device (e.g., network device 220). In some implementations, one or more process blocks of FIG. 6 may be performed by another device or a group of devices separate from or including the network device, such as a peer device (e.g., peer device 210).

As shown in FIG. 6, process 600 may include providing, to one or more neighboring network devices and periodically throughout a test session, a request message associated with requesting a first group of network performance indicator values that measure bi-directional network performance between the one or more neighboring network devices and a particular network device used as an endpoint in a network, wherein the network device and the one or more neighboring network devices are included in a group of network devices that are part of the network and that are configured with a protocol that includes a relay mechanism for measuring the network performance, wherein the request message includes a final destination address, wherein the one or more neighboring network devices, upon receiving the request message, are to use the relay mechanism and the final destination address to determine the first group of network performance indicator values, and wherein the relay mechanism permits the one or more neighboring network devices and other downstream network devices to exchange additional request messages and corresponding response messages that are used to determine the first group of network performance indicator values (block 610). For example, the network device (e.g., using switching component 310, output component 315, controller 320, and/or the like) may provide, to one or more neighboring network devices and periodically throughout a test session, a request message associated with requesting a first group of network performance indicator values that measure network performance between the one or more neighboring network devices and a particular network device used as an endpoint in a network, as described above in connection with FIGS. 1A-1E. In some implementations, the network device and the one or more neighboring network devices may be included in a group of network devices that are part of the network and that are configured with a protocol that includes a relay mechanism for measuring the network performance. In some implementations, the request message may include a final destination address. In some implementations, the one or more neighboring network devices, upon receiving the request message, may use the relay mechanism and the final destination address to determine the first group of network performance indicator values.

As further shown in FIG. 6, process 600 may include receiving, from the one or more neighboring network devices and periodically throughout the test session, a response message that includes the first group of network performance indicator values (block 620). For example, the network device (e.g., using input component 305, switching component 310, controller 320, and/or the like) may receive, from the one or more neighboring network devices and periodically throughout the test session, a response message that includes the first group of network performance indicator values, as described above in connection with FIGS. 1A-1E.

As further shown in FIG. 6, process 600 may include determining a second group of network performance indicator values that measure the network performance between the network device and the one or more neighboring network devices (block 630). For example, the network device (e.g., using switching component 310, controller 320, and/or the like) may determine a second group of network performance indicator values that measure the network performance between the network device and the one or more neighboring network devices, as described above in connection with FIGS. 1A-1E.

As further shown in FIG. 6, process 600 may include determining overall network performance indicator values based on the first group of network performance indicator values and the second group of network performance indicator values (block 640). For example, the network device (e.g., using switching component 310, controller 320, and/or the like) may determine overall network performance indicator values based on the first group of network performance indicator values and the second group of network performance indicator values, as described above in connection with FIGS. 1A-1E.

As further shown in FIG. 6, process 600 may include identifying a preferred next-hop to one of the one or more neighboring network devices based on the overall network performance indicator values, wherein the preferred next-hop is part of a preferred path to the particular network device that is the endpoint in the network, and wherein the preferred next-hop is to be used for traffic flow being routed through the network (block 650). For example, the network device (e.g., using switching component 310, controller 320, and/or the like) may identify a preferred next-hop to one of the one or more neighboring network devices based on the overall network performance indicator values, as described above in connection with FIGS. 1A-1E. In some implementations, the preferred next-hop is part of a preferred path to the particular network device that is the endpoint in the network, and the preferred next-hop may be used for traffic flow being routed through the network.

Process 600 may include additional implementations, such as any single implementation or any combination of implementations described below and/or in connection with one or more other processes described elsewhere herein.

In some implementations, the network device may initiate a connection with the one or more neighboring network devices before providing the request message to the one or more neighboring network devices, where initiating the connection causes the network device and the one or more neighboring network devices to exchange the relay mechanism, and may communicate with the one or more neighboring network devices to cause the test session to be established.

In some implementations, the protocol may be a two-way active measurement protocol (TWAMP). In some implementations, the group of network devices may be part of a mesh network that includes multiple possible paths to the particular network device that is used as the endpoint in the network.

In some implementations, the network device may populate, periodically throughout the test session, a data structure with values used to measure the network performance, where the data structure associates the values used to measure the network performance with the final destination address of a destination associated with the test session, a first Internet (IP) address associated with a first mode of the protocol used by the network device during the test session, and one or more IP addresses associated with a second mode of the protocol used by the one or more neighboring network devices during the test session.

In some implementations, the network device may update, based on receiving the response message periodically throughout the test session, the first group of network performance indicator values that are stored using a data structure that associates the first group of network performance indicator values with the final destination address of a destination associated with the test session, a first Internet protocol (IP) address associated with a first mode of the protocol used by the network device during the test session, and one or more IP addresses associated with a second mode of the protocol used by the one or more neighboring network devices during the test session, and may update the overall network performance indicator values based on updating the first group of network performance indicator values.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

As used herein, the term request message and/or the term response message may refer to or include a packet. A packet may refer to a communication structure for communicating information, such as a test packet, a probe packet, an internet control message protocol (ICMP) packet, a user datagram protocol (UDP) packet, a transmission control protocol (TCP) packet, a user-configured differentiated services code point (DSCP) type-of-service (ToS) packet, a hypertext transfer protocol (HTTP) packet, a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   initiating, by a network device, a connection with one or more neighboring network devices,
     wherein the network device and the one or more neighboring network devices are included in a group of network devices that are part of a network and that are configured with a protocol for measuring network performance, and
     wherein initiating the connection causes the network device and the one or more neighboring network devices to exchange a relay mechanism that is to be used for measuring the network performance;

causing, by the network device, a test session to be established and to be used for measuring the network performance;

providing, by the network device, to the one or more neighboring network devices, and periodically throughout the test session, a request message associated with requesting a first group of network performance indicator values that measure bi-directional network performance for one or more paths between the one or more neighboring network devices and a particular network device that is an endpoint in the network, wherein the one or more neighboring network devices, upon receiving the request message, are to use the relay mechanism to determine the first group of network performance indicator values, and wherein the relay mechanism permits the one or more neighboring network devices and other upstream network devices to exchange additional request messages and corresponding response messages that are used to determine the first group of network performance indicator values;

receiving, by the network device, from the one or more neighboring network devices, and periodically throughout the test session, a response message that includes the first group of network performance indicator values;

determining, by the network device, a second group of network performance indicator values that measure the network performance between the network device and the one or more neighboring network devices;

determining, by the network device, overall network performance indicator values based on the first group of network performance indicator values and the second group of network performance indicator values; and identifying, by the network device, a preferred next-hop to one of the one or more neighboring network devices based on the overall network performance indicator values, wherein the preferred next-hop is part of a preferred path to the particular network device that is the endpoint in the network, and wherein the preferred next-hop is to be used for traffic flow being routed through the network.

2. The method of claim 1, wherein the protocol is a two-way active measurement protocol (TWAMP).

3. The method of claim 1, wherein the request message includes a final destination address; and wherein providing the request message comprises:
    providing the request message to the one or more neighboring network devices to cause the one or more neighboring network devices to use the relay mechanism and the final destination address to determine the first group of performance indicator values.

4. The method of claim 1, wherein the first group of network performance indicator values and the second group of network performance indicator values are determined using a first set of time stamps indicating times when the request message is sent by one of the group of network devices and a second set of time stamps indicating times when the response message is received by another one of the group of network devices.

5. The method of claim 1, further comprising:
populating, periodically throughout the test session, a data structure with values used to measure the network performance, wherein the values used to measure the network performance are associated with:
        a destination address of a destination associated with the test session,
        a first Internet protocol (IP) address associated with a first mode of the protocol used by the network device during the test session, and
        one or more IP addresses associated with a second mode of the protocol used by the one or more neighboring network devices during the test session.

6. The method of claim 1, further comprising:
updating, periodically throughout the test session, the first group of network performance indicator values that are stored using a data structure that associates the first group of network performance indicator values with:
    a destination address of a destination associated with the test session,
    a first Internet protocol (IP) address associated with a first mode of the protocol used by the network device during the test session, and
    one or more IP addresses associated with a second mode of the protocol used by the one or more neighboring network devices during the test session; and updating the overall network performance indicator values based on updating the first group of network performance indicator values.

7. The method of claim 1, wherein receiving the first group of network performance indicator values includes receiving a first network performance indicator value from a first neighboring network device of the one or more neighboring network devices;

wherein determining the second group of network performance indicator values comprises:
    identifying a first time at which a first instance of the request message was sent to the first neighboring network device and a second time at which a first instance of the response message was received from the first neighboring network device, and
    determining a first network performance indicator value of the second group of network performance indicator values based on the first time and the second time; and wherein determining the overall network performance indicator values comprises:
    determining an overall network performance indicator value for a first path that traverses through the network device, the first neighboring network device, and the particular network device used as the endpoint in the network, by adding the first network performance indicator value of the first group of network performance indicator values and the first network performance indicator value of the second group of network performance indicator values.

8. A network device, comprising:
one or more memories; and
one or more processors, to:
    receive, from another network device, a request to establish a connection with the other network device,
        wherein the network device and the other network device are included in a group of network devices that are part of a network and that are configured with a protocol for measuring network performance;
    providing, to the other network device, a response to the request to cause the connection to be established, wherein the other network device uses the connection to interact with the network device to establish a test session and exchange a relay mechanism that is to be used for measuring the network performance;

receive, from the other network device and periodically throughout the test session, a request message that requests a first network performance indicator value that measures the network performance for a path between the network device and a particular network device that is used as an endpoint in the network;

provide, periodically throughout the test session and by using the relay mechanism, one or more additional request messages to one or more neighboring network devices to cause the one or more neighboring network devices to provide one or more additional response messages that include a group of network performance indicator values that measure the network performance between the one or more neighboring network devices and the particular network device that is used as the endpoint in the network;

determine, periodically throughout the test session, the first network performance indicator value based on the group of network performance indicator values that have been provided by the one or more neighboring network devices; and provide, to the other network device and periodically throughout the test session, a response message that includes the first network performance indicator value to cause the other network device to use the first network performance indicator value as part of determining an overall network performance indicator value and to identify a preferred next-hop to one of the one or more neighboring network devices based on the overall network performance indicator values, wherein the preferred next-hop is part of a preferred path to the particular network device that is the endpoint in the network, and wherein the preferred next-hop is to be used for traffic flow being routed through the network.

9. The network device of claim 8, wherein the protocol is a two-way active measurement protocol (TWAMP).

10. The network device of claim 8, wherein the group of network devices are part of a network that includes multiple paths to the particular network device that is used as the endpoint.

11. The network device of claim 8, wherein the request message and the one or more additional request messages include a final destination address; and wherein the one or more processors, when providing the one or more additional request messages, are to:

provide the one or more additional request messages to the one or more neighboring network devices to cause the one or more neighboring network devices to use the relay mechanism and the final destination address to determine the one or more performance indicator values.

12. The network device of claim 8, wherein the group of network performance indicator values is a first group of network performance indicator values; and wherein the one or more processors, when determining the first network performance indicator value, are to:

identify a first time at which the one or more additional request messages are sent to the one or more neighboring network devices, identify a second time at which the one or more additional response messages are received from the one or more neighboring network devices, determine a second group of network performance indicator values based on the first time and the second time, and determine the first network performance indicator value based on the one or more network performance indicator values and the second group of network performance indicator values.

13. The network device of claim 8, wherein the group of network performance indicator values is a first group of network performance indicator values;

wherein multiple paths through the group of network devices are present between the network device and the particular network device that is used as the endpoint; and wherein the one or more processors, when determining the first network performance indicator value, are to:

determine a second group of network performance indicator values that measure the network performance between the network device and the one or more neighboring network devices, determine a third group of network performance indicator values that are based on the first group of network performance indicator values and the second group of network performance indicator values, and use, as the first network performance indicator value, a particular network performance indicator value, of the third group of network performance indicator values, that is associated with a best available network performance level.

14. The network device of claim 8, wherein the one or more processors are further to:

populate, periodically throughout the test session, a data structure with values used to measure the network performance, wherein the values used to measure the network performance are associated with:

a destination address of a destination associated with the test session, a first Internet protocol (IP) address associated with a first mode of the protocol used by the network device during the test session, and one or more IP addresses associated with a second mode of the protocol used by the one or more neighboring network devices during the test session.

15. A non-transitory computer-readable medium storing one or more instructions, the one or more instructions comprising:

one or more instructions that, when executed by one or more processors of a network device, cause the one or more processors to:

provide, to one or more neighboring network devices and periodically throughout a test session, a request message associated with requesting a first group of network performance indicator values that measure bi-directional network performance between the one or more neighboring network devices and a particular network device used as an endpoint in a network, wherein the network device and the one or more neighboring network devices are included in a group of network devices that are part of the network and that are configured with a protocol that includes a relay mechanism for measuring the network performance, wherein the request message includes a final destination address,
wherein the one or more neighboring network devices, upon receiving the request message, are to use the relay mechanism and the final destination address to determine the first group of network performance indicator values, and
wherein the relay mechanism permits the one or more neighboring network devices and other upstream network devices to exchange additional request messages and corresponding response messages that are used to determine the first group of network performance indicator values;
receive, from the one or more neighboring network devices and periodically throughout the test session, a response message that includes the first group of network performance indicator values;
determine a second group of network performance indicator values that measure the network performance between the network device and the one or more neighboring network devices;
determine overall network performance indicator values based on the first group of network performance indicator values and the second group of network performance indicator values; and
identify a preferred next-hop to one of the one or more neighboring network devices based on the overall network performance indicator values,
wherein the preferred next-hop is part of a preferred path to the particular network device that is the endpoint in the network, and
wherein the preferred next-hop is to be used for traffic flow being routed through the network.

16. The non-transitory computer-readable medium of claim 15, wherein the one or more instructions, when executed by the one or more processors, further cause the one or more processors to:
initiate a connection with the one or more neighboring network devices before providing the request message to the one or more neighboring network devices,
wherein initiating the connection causes the network device and the one or more neighboring network devices to exchange the relay mechanism; and
communicate with the one or more neighboring network devices to cause the test session to be established.

17. The non-transitory computer-readable medium of claim 15, wherein the protocol is a two-way active measurement protocol (TWAMP).

18. The non-transitory computer-readable medium of claim 15, wherein the group of network devices are part of a mesh network that includes multiple possible paths to the particular network device that is used as the endpoint in the network.

19. The non-transitory computer-readable medium of claim 15, wherein the one or more instructions, when executed by the one or more processors, further cause the one or more processors to:
populate, periodically throughout the test session, a data structure with values used to measure the network performance,
wherein the data structure associates the values used to measure the network performance with:
the final destination address of a destination associated with the test session,
a first Internet (IP) address associated with a first mode of the protocol used by the network device during the test session, and
one or more IP addresses associated with a second mode of the protocol used by the one or more neighboring network devices during the test session.

20. The non-transitory computer-readable medium of claim 15, wherein the one or more instructions, when executed by the one or more processors, further cause the one or more processors to:
update, based on receiving the response message periodically throughout the test session, the first group of network performance indicator values that are stored using a data structure that associates the first group of network performance indicator values with:
the final destination address of a destination associated with the test session,
a first Internet protocol (IP) address associated with a first mode of the protocol used by the network device during the test session, and
one or more IP addresses associated with a second mode of the protocol used by the one or more neighboring network devices during the test session; and
update the overall network performance indicator values based on updating the first group of network performance indicator values.

* * * * *